United States Patent [19]

Fikentscher et al.

[11] Patent Number: 5,393,463

[45] Date of Patent: Feb. 28, 1995

[54] USE OF TRIALKANOLAMINE POLYETHERS AS DEMULSIFIERS FOR OIL-IN-WATER EMULSIONS

[75] Inventors: Rolf Fikentscher; Knut Oppenlaender, both of Ludwigshafen; Johannes P. Dix, Weisenheim; Wilfried Sager, Mutterstadt; Hans-Henning Vogel, Frankenthal; Klaus Barthold, Mannheim; Guenther Elfers, Birkenau, all of Germany

[73] Assignee: BASF Aktiengesellschaft, Ludwigshafen, Germany

[21] Appl. No.: 128,267

[22] Filed: Sep. 29, 1993

Related U.S. Application Data

[62] Division of Ser. No. 646,679, Jan. 28, 1991, abandoned.

[30] Foreign Application Priority Data

Feb. 3, 1990 [DE] Germany ............... 4003243

[51] Int. Cl.$^6$ ............................................. B01D 17/04
[52] U.S. Cl. ........................................ 252/344; 252/358
[58] Field of Search ............................... 252/344, 358

[56] References Cited

U.S. PATENT DOCUMENTS

| | | | |
|---|---|---|---|
| 2,407,895 | 9/1946 | Monson .................. | 252/344 |
| 3,528,928 | 9/1970 | Rushton ................. | 252/341 |
| 3,893,615 | 7/1975 | Johnson et al. ........ | 232/43.2 |
| 4,129,508 | 12/1978 | Frühauf ................. | 252/33 |
| 4,179,396 | 12/1979 | Gabel et al. ........... | 252/329 |
| 4,333,947 | 6/1982 | Karjalainen et al. ... | 542/400 X |
| 4,383,933 | 5/1983 | Jenkins ................. | 252/329 |
| 4,404,362 | 9/1983 | Bellos et al. .......... | 252/344 X |
| 4,459,220 | 7/1984 | Bellos et al. .......... | 252/344 |
| 4,500,735 | 2/1985 | Diery et al. ........... | 252/358 |
| 4,505,839 | 3/1985 | Bellos et al. .......... | 252/344 |
| 4,731,481 | 3/1988 | Bellos et al. .......... | 252/344 X |
| 4,840,748 | 6/1989 | Bellos et al. .......... | 252/344 |
| 4,931,065 | 6/1990 | Baumgarte et al. .... | 8/188 |
| 5,013,452 | 5/1992 | Bellos et al. .......... | 210/708 |
| 5,015,754 | 5/1991 | Dix et al. .............. | 558/260 |

FOREIGN PATENT DOCUMENTS 0392697 10/1990 European Pat. Off. .

OTHER PUBLICATIONS

*The Merck Index,* 10th ed. (Merck and Co., Inc., Rahway, N.J., 1983) pp. 711 and 1059.
*Kirk–Othmer Encyclopedia of Chemical Technology,* vol. 17 (John Wiley & Sons, Inc., 1982) pp. 441, 520–523.
Douglas, Bodie Eugene, *Concepts and Models of Inorganic Chemistry,* (John Wiley & Sons, Inc., 1983) p. 527.
Derwent Abstract AN 68-87024P/00 (87024P) (corresponding to DE 1243874).
Database Chemical Abstracts, vol. 106, No. 24, Abst. No. 198881, 1984.

*Primary Examiner*—Robert L. Stoll
*Assistant Examiner*—Daniel S. Metzmaier
*Attorney, Agent, or Firm*—Keil & Weinkauf

[57] ABSTRACT

The present invention relates to the use of trialkanolamine polyethers obtained by condensation of one or more trialkanolamines in the presence of phosphorous acid and/or hypophosphorous acid as demulsifiers for oil-in-water emulsions.

1 Claim, No Drawings

USE OF TRIALKANOLAMINE POLYETHERS AS DEMULSIFIERS FOR OIL-IN-WATER EMULSIONS

This application is a division of application Ser. No. 07/646,679, filed on Jan. 28, 1991, now abandoned.

The present invention females to the use of trialkanolamine polyethers as demulsifiers for oil-in-water emulsions.

The production and subsequent processing of crude oils involves large quantities of oil-in-water emulsions in which the continuous phase depends on the ratio of water to oil, on the natural emulsifier system contained in the oil and on the origin of the emulsion. Most of the crude oil to be transported is in the form of a water-in-oil emulsion which must be broken by the addition of chemical demulsifiers. The separated brine contains a certain amount of residual oil and there is a tendency for oil-in-water emulsions to form.

The tendency for oil-in-water emulsions to occur when crude oils are processed on the oil field or in refineries is even stronger. The amount of emulsified crude oil in said oil-in-water emulsions can be up to 5%. To remove this residual oil content, use is made of special demulsifiers, so-called 'deoilers', which are usually cationic polymers, as described, for example, in DE 3,404,538. Typical products are also described in U.S. Pat. Nos. 3,528,928, and 4,333,947.

The removal of the residual oil content is necessary for clarification and processing of oil field waste water and for ecological and engineering reasons, since, for example, when said water is used for secondary production by water drive the presence of residual oil therein would increase the injection pressure.

U.S. Pat. No. 2,407,895 describes a method of breaking oil-in-water emulsions with comparatively low molecular weight condensates of alkanolamines, prepared by condensation in the presence of basic catalysts.

Further, U.S. Pat. Nos. 4,179,396 and 4,383,933 describe deoilers prepared from aluminum salts or titanium tetrachloride and alkanolamine condensates, which may have been partially acylated or quaternized.

In addition, U.S. Pat. Nos. 4,505,839 and 4,731,481 describe the use of quaternized and low molecular weight alkanolamine polycondensates as deoilers, which have been prepared by catalytic reaction with $ZnCl_2$/acetic acid or $Al_2(SO_4)_3$/acetic acid.

Also, U.S. Pat. Nos. 4,404,362 and 4,459,220 describe block polycondensates prepared by the condensation of triethanolamine polycondensates and triisopropanolamine polycondensates separately synthesized by catalytic reaction with Lewis acids or mineral acids.

However, such prior demulsifiers are not satisfactory.

We have now found that trialkanolamine polyethers obtained by condensation of one or more trialkanolamines in the presence of phosphorous acid and/or hypophosphorous acid are highly effective demulsifiers for oil-in-water emulsions and are, when used for this purpose, superior to the prior art deoilers in respect of general usefulness and emulsion-breaking speed and are largely insensitive to overdosing. They contain no metal salts, in particular no chlorides, which could have a corrosive action. Unlike deoilers which have been prepared by condensation in the presence of carboxylic acids, the demulsifiers of the invention contain no carboxylate groups which could impair their efficiency.

The preferred and particularly effective compounds are trialkanolamine polyethers prepared by condensation, in the presence of phosphorous acid and/or hypophosphorous acid, of one or more trialkanolamines of the formula

in which $R^1$ to $R^3$ denote the same or different 1,2-alkylene groups of from 2 to 4 carbon atoms.

The trialkanolamine polyethers are prepared by condensing the trialkanolamines, preferably triethanolamine or triisopropanolamine $N[CH_2-CH(CH_3)\text{-}OH]_3$ or mixtures of several trialkanolamines in the presence of phosphorous acid ($H_3PO_3$) and/or hypophosphorous acid ($H_3PO_2$). The phosphorous acid and/or hypophosphorous acid is advantageously used, calculated as 100% acid, in an amount of from 0.05 to 2% w/w and preferably from 0.1 to 1.0% w/w of the trialkanolamine to be condensed. Generally, the temperature used for the condensation ranges from 120° to 280° C. and is preferably from 150° to 260° C. and more preferably from 180° to 240° C. The reaction is generally carried out over a period of from 1 to 10 hours and preferably from 4 to 8 hours. Advantageously, the degree of condensation is controlled by varying the temperature and time of reaction in such a manner that when triethanolamine is used as starting material, the viscosity of the resulting triethanolamine polyether is in the range of 10,000 to 100,000 mPa.s, preferably 20,000 to 50,000 mPa.s, and, similarly, the viscosity of the triisopropanolamine polyether is in the range of 100,000 to 1,000,000 mPa.s, preferably 200,000 to 600,000 mPa.s, and that of a mixed condensate from, preferably, equimolar amounts of triethanolamine and triisopropanolamine is in the range of 80,000 to 400,000 mPa.s, preferably 100,000 to 300,000 mPa.s (measured, in all cases, on the undiluted product at 20° C.).

The trialkanolamine polyethers of the invention are advantageously added to the oil-in-water emulsions, for the purpose of breaking the same, in amounts of from 1 to 100 ppm, preferably from 1 to 30 ppm and more preferably from 2 to 10 ppm, by weight.

Synthesis Example 1,788 g of triethanolamine and 12 g of hypophosphorous acid (50% aqueous solution) were heated at 225° to 230° C. with stirring under a weak stream of nitrogen. The water of reaction was distilled off. After 7 to 8 hours, at which point the viscosity was 21,000 mPa.s, condensation was terminated by cooling to room temperature. There were obtained 1,492 g of triethanolamine polyether (amine number 7.69 mmoles/g).

Example of application

Graduated, transparent test bottles of rectangular cross-section and having a capacity of 177.44 ml were filled with 100 ml of the oil-in-water emulsion to be tested. Various amounts of demulsifier were added to the oil-in-water emulsions in the test bottles to cover the range of 1 to 10 ppm of demulsifier in the emulsion, by weight. The test bottles containing the test samples were shaken 50 times and then assessed for water clarity according to the criteria given below. This test procedure was repeated twice. The samples were then shaken 100 times and assessed and then shaken 150 times for the final assessment. If the amount of oil present was sufficient to cause the oil to adhere to the inside of the bottle, thus making assessment difficult, the sample was decanted after the second shaking treatment and poured into a clean test bottle.

Assessment scale 10 untreated—no change in appearance of emulsion
9 slight change in color of emulsion
8 emulsion shows distinct change of color
7 water pale yellow
6 water white—numbers or letters on the base of the bottle are legible
5 water white—numbers or letters on the long side of the bottle are legible when viewed through the bottle in the direction parallel to the short side of the bottle
4 water white—numbers on the long side of the bottle are legible when viewed through the bottle in the direction parallel to the short side of the bottle
3 water white—numbers on the short side of the bottle are legible when viewed through the bottle in the direction parallel to the long side of the bottle
2 water white—numbers on the short side of the bottle are legible when viewed through the bottle in the direction parallel to the long side of the bottle
1 water very clear—numbers on the short side of the bottle are very clearly legible when viewed through the bottle in the direction parallel to the long side of the bottle.

The test emulsion was an oil-in-water emulsion from a petroleum processing plant and had an oil content of 430 ppm by weight, It was treated with the demulsifier at ambient temperature.

| Demulsifier | Amount used [ppm w/w] | Assessment after shaking the sample | | | | |
|---|---|---|---|---|---|---|
| | | 50 times | 50 times | 50 times | 100 times | 150 times |
| triethanolamine polyether of synthesis Example of present invention | 6 | 8 | 5 | 2 | 1 | 1 |

The use of the triethanolamine polyether as a deoiler in accordance with the present invention gave good results over a wide range of concentrations. The deoiler was largely insensitive to overdosing. Furthermore, it showed no adverse interaction with other demulsifiers such as those used for breaking water-in-oil emulsions.

We claim:

1. In the process for demusifying oil-in-water emulsions wherein the emulsions are treated with trialkanolamine polyethers obtained by the condensation of one or more trialkanolamines, the improvement wherein the polyethers are prepared by the condensation of triethanolamine in the presence of phosphorous acid and/or hypophosphorous acid;

wherein the phosphorous and/or hypophosphourous acid is present, calculated as 100% acid, in an amount of from 0.05 to 2% w/w of the triethanolamine and the condensation is terminated at the point where the viscosity of the resultant triethanolamine polyether has a viscosity of 10,000 to 100,000 mPa.s.

* * * * *